United States Patent [19]
Farr et al.

[11] 4,369,863
[45] Jan. 25, 1983

[54] INTERNAL SHOE DRUM BRAKES FOR VEHICLES

[75] Inventors: Glyn P. R. Farr, Leek Wooton; Colin S. Matthews, Dormansland, both of England

[73] Assignee: Lucas Industries Limited, Birmingham, England

[21] Appl. No.: 182,502

[22] Filed: Aug. 29, 1980

[30] Foreign Application Priority Data

Aug. 31, 1979 [GB] United Kingdom ............... 7930349
Oct. 25, 1979 [GB] United Kingdom ............... 7937000

[51] Int. Cl.³ .................................................. F16D 65/24
[52] U.S. Cl. ............................ 188/106 A; 188/106 F; 188/326; 188/327; 188/334; 188/363; 188/364; 188/196 D; 192/75; 192/85 AT; 192/111 T
[58] Field of Search ............... 188/325, 326, 331, 334, 188/327, 342, 363, 364, 196 D, 106 F, 106 A; 192/75, 85 AT, 111 T

[56] References Cited

U.S. PATENT DOCUMENTS

| | | | |
|---|---|---|---|
| 1,944,490 | 1/1934 | Bowen | 188/106 A |
| 1,986,430 | 1/1935 | Frank | 188/106 A |
| 2,140,741 | 12/1938 | Goepfrich | 188/331 |
| 2,239,916 | 4/1941 | Hart | 188/364 X |
| 2,385,812 | 10/1945 | Hoyt | 188/106 A X |
| 2,775,315 | 12/1956 | Maruhn et al. | 188/331 |
| 3,744,595 | 7/1973 | Adams | 188/331 X |
| 3,811,538 | 5/1974 | Farr | 188/196 D X |
| 3,838,757 | 10/1974 | Farr | 188/196 D X |

FOREIGN PATENT DOCUMENTS 466126  6/1950  Canada ............................ 188/363

*Primary Examiner*—George E. A. Halvosa
*Attorney, Agent, or Firm*—Scrivener, Clarke, Scrivener and Johnson

[57] ABSTRACT

An internal shoe-drum brake is disclosed in which a pair of arcuate shoes can be applied to a rotatable drum by an hydraulic actuation system for normal service braking when the brake acts as a brake of the "two-leading" shoe type and a mechanical actuation system for parking or emergency braking when the brake acts as a brake of the "duo-servo" type. The hydraulic system comprises two hydraulic pistons, each of which acts on the leading end of a respective shoe, and first and second abutments are provided against which the trailing ends of the shoes are adapted to rest. One abutment is fixed but the other abutment includes an auxiliary hydraulic piston which is adapted to be urged against a fixed stop by hydraulic pressure applied to the pistons. The reaction from the trailing end of a respective shoe tends to urge the piston away from the stop, but the area of the piston is sufficient to prevent this happening when the hydraulic pressure is acting on the piston. A floating mechanical strut acts between the shoes to transmit the reaction from the trailing end to the leading end when no hydraulic pressure is applied to the auxiliary piston.

7 Claims, 14 Drawing Figures

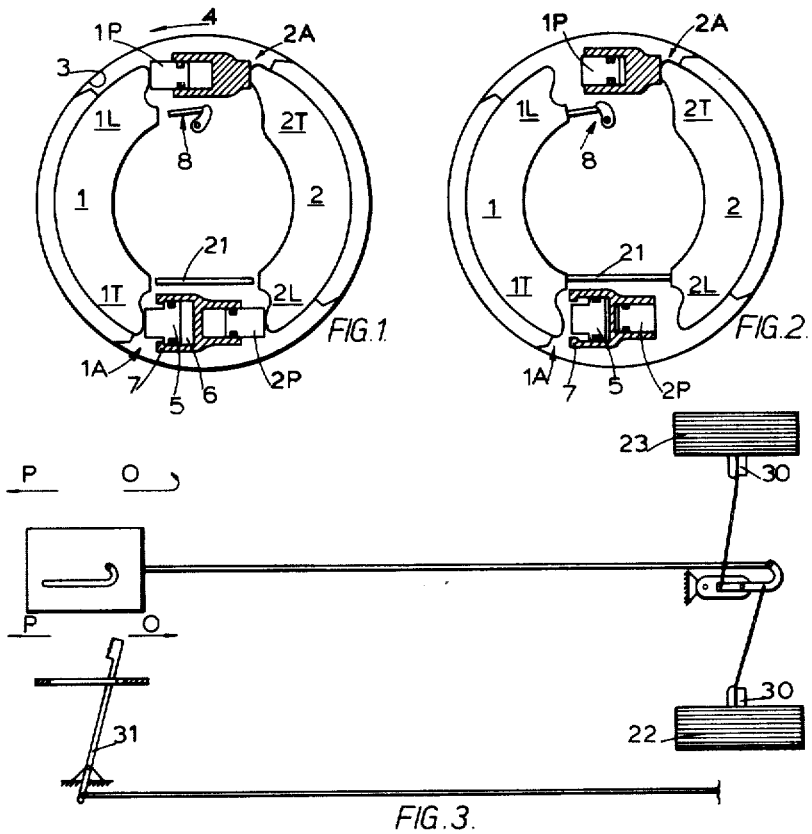

INTERNAL SHOE DRUM BRAKES FOR VEHICLES

SPECIFIC DESCRIPTION

This invention relates to internal shoe-drum brakes for vehicles of the kind in which a pair of arcuate shoes carrying friction linings are adapted to be applied to a rotatable drum by two independent actuation systems, namely an hydraulic system for normal service braking and a mechanical actuation system for parking or emergency braking.

In G.B. patent Specification No. 1,427,521 we have disclosed a brake of the kind set forth in which the brake acts as a brake of the one-leading one-trailing type for normal service braking, and changes automatically to act as a brake of the duo-servo type for parking or emergency braking. In such a construction the hydraulic system separates adjacent shoe ends to urge the leading end of one shoe away from the trailing end of the other shoe, and the mechanical actuation system acts on the leading end of one shoe, known as the primary shoe, with the thrust from the trailing end of that shoe being transmitted to the leading end of the other shoe, known as the secondary shoe, to provide a servo or self-energising action, the drag on the shoes being transmitted to an abutment adjacent to the mechanical actuation system from the trailing end of the secondary shoe.

According to our invention in an internal shoe-drum brake of the kind set forth the hydraulic system acts on the leading ends of both shoes so that for normal service braking the brake acts as a brake of the two leading shoe type, and the mechanical actuation system acts only on the leading end of one of the shoes with the thrust from that shoe being transmitted to the leading end of the other shoe so that for parking or emergency braking the brake acts as a brake of the duo-servo type.

In a shoe-drum brake of the two-leading shoe type, it is necessary to provide a moving actuator at the leading end of each shoe so that such actuators must be located substantially in diametrically opposed positions in the brake.

Conveniently in the brake of our invention each shoe is adapted to be applied to the drum by supplying hydraulic fluid under pressure to two pistons which are each disposed at the leading end of a different shoe, and first and second abutments are provided against which the trailing ends of the shoes are adapted to rest, one of the abutments being fixed, and the other abutment including an auxiliary hydraulic piston which is adapted to be urged against a fixed stop by hydraulic pressure applied to the said two pistons whereby the reaction from the trailing end of one shoe is in a direction tending to urge the auxiliary piston away from the stop in opposition to the hydraulic pressure, the area of the auxiliary piston being chosen to hold the auxiliary piston against the stop to counter the reaction from the trailing end of said one shoe, and a floating mechanical strut acts between the shoes to transmit the reaction from the trailing end of one shoe to the leading end of the other shoe when no hydraulic pressure is applied to the auxiliary piston.

Preferably, the brake is of the two-leading shoe type for hydraulically actuated service braking and of the duo-servo type for mechanically actuated parking, or emergency braking, for both directions of drum rotation.

For this purpose, the brake may be provided with two auxiliary pistons in the form of annular sleeves, each concentrically surrounding a respective one of the said two hydraulic pistons, the two hydraulic pistons being in abutment in the absence of hydraulic pressure to constitute the floating mechanical strut, and the mechanical actuation system comprises a floating expander which acts to urge the leading end of the primary shoe apart from the trailing end of the secondary shoe by reaction against the trailing end of the secondary shoe when the brake acts as a brake of the duo-servo type.

The pistons may be coupled together against relative rotation and may act on the shoe ends through tappets which are in screwed-threaded engagement with the pistons and are held against rotation by the shoe-ends, rotation of the pistons relative to the tappets causing the tappets to move relatively away from each other to compensate for wear of the friction linings.

The piston can be rotated manually. However, according to another aspect of our invention, a drive ring having a fast thread engagement with one of the first pistons is urged at all times into engagement with a conical surface in a member mounted in the auxiliary piston or sleeve, the member being non-rotatable with respect to the corresponding auxiliary piston, but being slidable with respect thereto, and the member being urged against a stop in the auxiliary piston by a spring such that the member moves clear of the stop, against the load in the spring, in the event that the load required to cause the piston to rotate with respect to the tappet with which it is screw-threadably engaged rises above a pre-determined value.

All the components of the adjuster can therefore be housed within a common housing containing fluid for subjecting the pistons to hydraulic pressure when adjacent shoe ends are to be separated by movement of the pistons in opposite directions away from each other.

The fast thread is exposed directly to the fluid, but the slow thread is separated from it by the wall of the first piston. This is considered to be satisfactory since the slow thread is probably the least sensitive of the relatively movable engagements.

The first piston performs the function of an additional, rotatable member in known adjusters. If such an additional component were embodied, extra hydraulic seals would then be required which could lead to unreliability. Causing a piston to rotate under hydraulic pressure is not normally good practice, but the adjuster can be arranged to cease adjusting if the hydraulic pressure builds up beyond a pre-determined value. Thus the piston only need move axially at the high pressures, and not rotate, if the adjuster is arranged to be "load-insensitive" (which is the conventional term for an adjuster which is disabled when a load, or pressure, exceeds a pre-determined value).

The conical clutch cannot be formed in the fixed housing in which the pistons are housed, since the gross movements of the pistons during mechanical actuation would then be sensed as excess slack.

The invention will now be further described by way of example with reference to the accompanying drawings in which:

FIGS. 1 and 2 are sectioned elevations of an internal shoe-drum brake constructed according to the invention;

FIG. 3 is a scheme of a vehicle parking brake layout;

FIG. 4 is a sectioned elevation of another brake;

Figure 5:
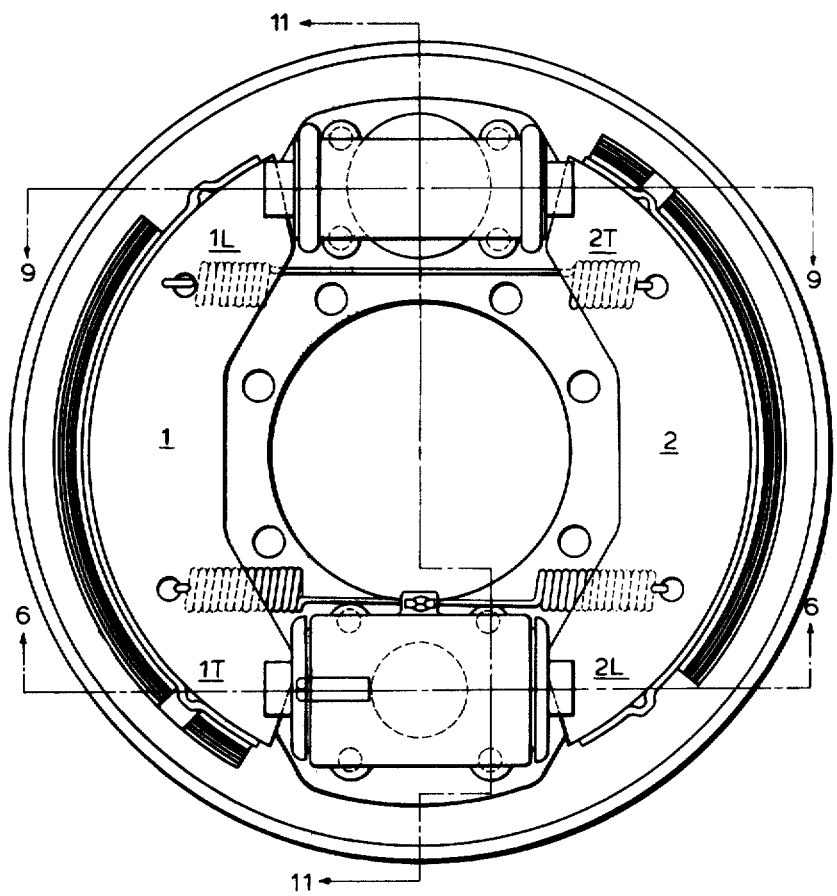
FIG. 5 is an elevation of yet another brake.

The internal shoe-drum brake illustrated in FIGS. 1 and 2 of the drawings comprises first and second shoes 1, 2 which carry linings for frictional engagement with the inside surface 3 of a drum, rotatable in the direction 4, the shoes 1,2 having leading ends 1L, 2L and trailing ends 1T, 2T respectively.

In FIG. 1 the brake is shown being actuated hydraulically. As illustrated hydraulic pistons 1P, 2P act on the leading ends 1L, 2L of the two shoes 1, 2. When pressure is supplied to these pistons 1P,2P, the shoes 1, 2 move outwardly to contact the drum, with both shoes acting as leading shoes and the drag forces being taken by respective abutments shown generally by 1A and 2A.

The abutment 2A is fixed, i.e. it is part of the fixed structure of the brake. The abutment 1A includes an auxiliary hydraulic piston 5, working in a complementary cylinder 6. The cylinder 6 is part of the fixed structure of the brake, and incorporates a stop in the form of a shoulder 7 to limit outward movement of the piston 5 relative to the cylinder 6. The piston 5 is stepped and hydraulic pressure applied to the piston 5 holds it against the shoulder 7.

All the pistons 1P, 2P, and 5 may be connected together by pipes, so that each is subjected to exactly the same pressure. It may be convenient however to supply the two pistons of a two-leading drum brake type from separate sources, for dual circuit operation, so that the two pressures would then be only nominally the same. In such a case, the auxiliary piston 5 could be supplied from either of the two sources.

The piston 5 is of sufficiently large area for the hydraulic pressure to hold it against the shoulder 7 even though the drag reaction between the trailing end 1T of the first shoe is tending to dislodge the piston 5 from its contact with the shoulder 7. For hydraulic operation, the first shoe 1 therefore behaves as if it were in abutment with a fixed abutment, in the same manner as the second shoe 2. Thus the shoes 1,2 are in the two-leading shoe arrangement.

The brake is shown being actuated mechanically in FIG. 2.

For this purpose the brake includes a mechanical expander 8 situated at the end 1L of the first shoe 1 and a mechanical strut 21, situated between the shoe-ends 1T and 2L. When the expander 8 is operated, the end 1L is urged to the left to engage the drum. If there is now no pressure supply to the auxiliary piston 5, the abutment 1A collapses, and the first shoe 1, known as the primary shoe, is carried round in an anti-clockwise direction 4 with the drum 3 until the floating strut 21 is in contact with both shoe-ends 1T and 2L. Further movement in the same direction brings the end 2T into contact with the fixed abutment 2A. Thus the drag reaction of the first shoe 1 is transmitted through the strut 21 to actuate the second shoe 2, known as the secondary shoe, and the brake operates as a brake of the duo-servo type. This is achieved since the strut 21 is floating and follows the movement of the shoes 1,2 without abutting against the fixed structure of the brake.

Should the mechanical expander 8 be operated when there is hydraulic pressure acting on the pistons 1P, 2P and 5 then the abutment 1A would not collapse. Thus it is not possible to lock in a mechanical actuation force unless the hydraulic pressure is first released, a circumstance which is inconvenient for the vehicle driver who must release the service brake before he can set the parking brake.

To overcome this problem, the mechanical actuator may be applied by a spring, in much the same manner as is described in GB patent Specification No. 1,427,521. Two brakes 22, 23 are shown on an axle 14 in FIG. 3. Each brake 22, 23 is provided with a spring 30 arranged in a manner which is described later, and each spring 30 acts to hold the respective brake "on". The brake is released by withdrawing the spring 30, by means of the parking brake lever 31 which is movable into an "off" position "O". The lever 31 may be latched in the position in which the spring 30 is fully withdrawn, to hold the brake "off" for normal motoring. Thus, when the lever 31 is moved to the brake "on" position "P", if hydraulic pressure is present at the time, then the spring will automatically set the brake "on" later (in the duo-servo arrangement, of course) when the pressure is released without the driver having to time his braking operations in a particular sequence.

In the brake illustrated in FIG. 4 the mechanical actuator comprises a wedge-and-roller actuator 40 housed within an hydraulic chamber 41 which is incorporated in the bore in which the piston 1P works. Also the piston 2P and the auxiliary piston 5 are located inside a common hydraulic chamber 42. The piston 2P has further been provided with an extension 43 projecting towards the piston 5.

The brake is shown being actuated by hydraulic pressure, with the shoes in the two-leading shoe arrangement, as described in relation to FIGS. 1 and 2.

When the brake is to be actuated mechanically a push rod 44 of the actuator 40 is forced downwardly, causing the piston 1P to move outwardly, in turn causing the shoe 1 to engage with the drum 3. The shoe 1 is carried round with the drum 3 and if there is no hydraulic pressure in the chamber 42, the auxiliary piston 5 is urged by the shoe 1 into engagement with the extension 43 of the piston 2P. The piston 2P then transfers the reaction force from the shoe 1 to the end 2L of the second shoe 2, which abuts against the fixed abutment 2A.

Thus the auxiliary piston 5 and the piston 2P constitute a floating solid mechanical strut to replace the external strut 21 shown in FIGS. 1 and 2 and the brake operates as a brake of the duo-servo type.

The brakes shown thus far only have the property of reliable brakes of the hydraulic two-leading shoe type/-mechanical-duo-servo type in one direction of rotation of drum rotation only. Normally in practice, the brake is required to have the same properties in both directions. These, and other practical features, are illustrated in the brakes shown in FIGS. 5-14 of the drawings.

Figure 6:
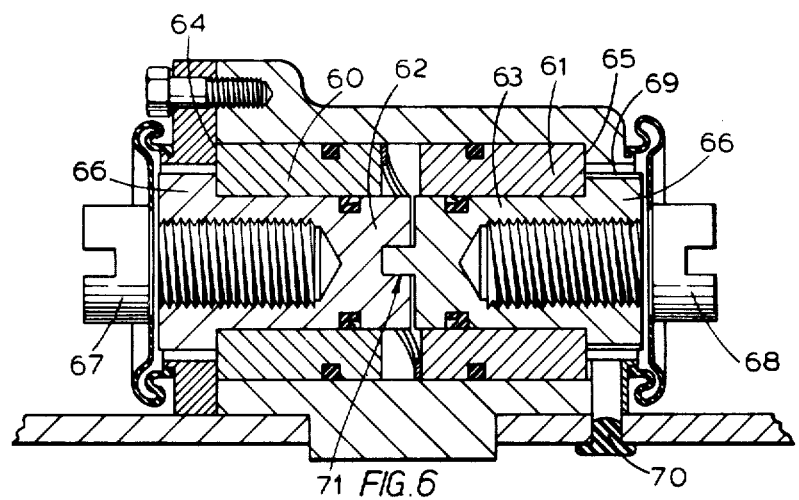
FIG. 6 is a section on line 6—6 of FIG. 5.
Figure 7:
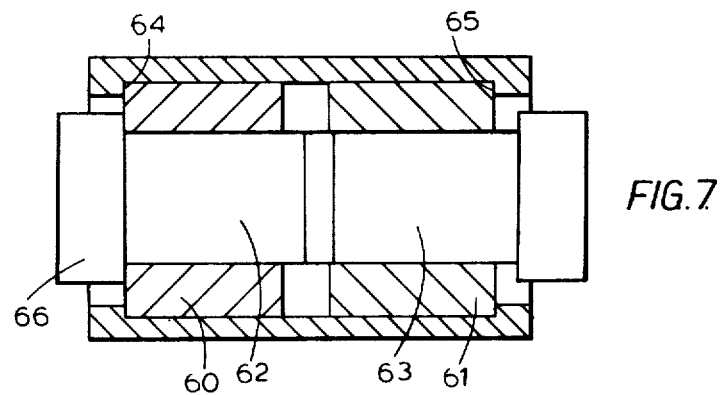
FIGS. 7 and 8 are diagrammatic versions of FIG. 6.
Figure 8:
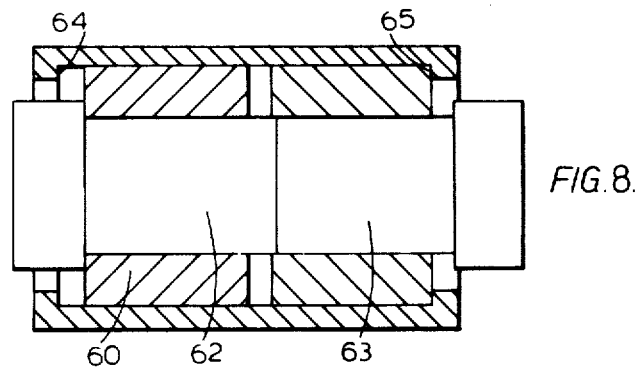

FIG. 6 is a section on the line 6—6 of the general elevation of FIG. 5. Two auxiliary pistons one for each direction of rotation are formed as annular sleeves 60, 61. Hydraulic pistons 62, 63 are arranged concentrically and work inside the sleeves. FIGS. 7 and 8 are diagramatic versions of FIG. 6 and show the brake being actuated respectively hydraulically and mechanically with the drum rotating anti-clockwise. Hydraulic pressure urges both sleeves 60, 61 outwards, into contact with spaced shoulders 64, 65 in a housing at opposite ends of a bore in which both sleeves 60, 61 work, as shown in FIG. 7, and the pressure also urges the pistons 62, 63 into contact with the shoe ends 1T and 2L.

The drag reaction from the end 1T of the shoe 1 acts to the left, bringing a flange 66 formed on the piston 62 into contact with the sleeve 60. The sleeve 60 is not forced away from the shoulder 64 formed in the fixed housing 68 because its area is sufficiently large for the hydraulic pressure to hold it against the shoulder 64. A sleeve area of substantially twice the area of the piston 62 is sufficient to guarantee that the sleeve 60 does not move away from the shoulder 64. The other piston 63 urges the end 2L of the second shoe 2 to the right, and the other sleeve 61 merely abuts the shoulder 65 and plays no part in anti-clockwise braking.

When the brake is actuated mechanically the components adopt the positions shown in FIG. 8. The piston 62 abuts the piston 63 to form a floating solid mechanical strut, the sleeve 60 being easily moved away from the shoulder 64 in the absence of hydraulic pressure. It will be noted that for clockwise drum rotation, the components will take up the mirror image positions of FIGS. 7 and 8.

Figure 9:
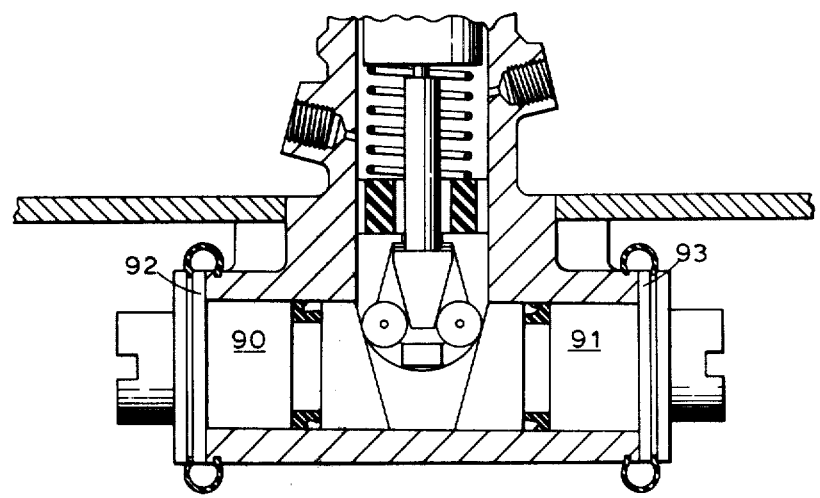
FIG. 9 is a section on the line 9—9 of FIG. 5.
Figure 10:
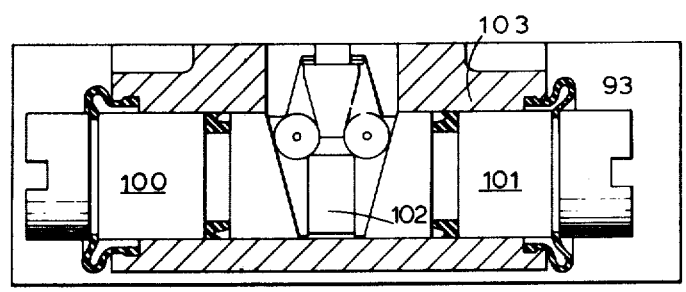
FIG. 10 is a section similar to FIG. 9 but showing an alternative.

A combined mechanical and hydraulic actuator, shown in FIG. 9, is located on the other side of the brake. The two hydraulic pistons 90, 91 are provided with flanges 92, 93 one of which acts as the fixed abutment for the trailing end of the appropriate shoe, as dependent on the direction of rotation. In FIG. 10 an alternative is shown wherein the two hydraulic pistons, indicated by 100, 101, do not have flanges but their movement is limited by the pillar 102, placed between the two pistons 100, 101 and formed as part of the housing 103.

Figure 11:
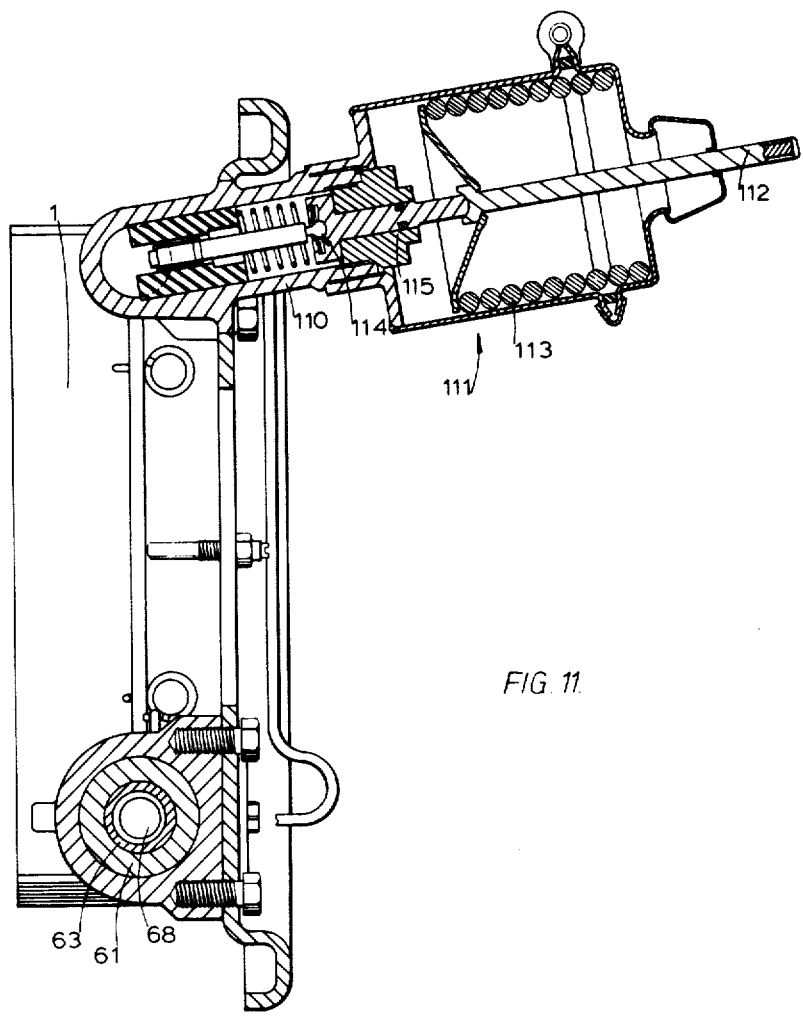
FIG. 11 is a section on line 11—11 of FIG. 5.

FIG. 11 is a section on line 11—11 of FIG. 5. The housing 110 forms a mounting for a spring chamber 111. The actuator rod 112 is pulled to the right to compress the spring 113, when the brake is not being actuated mechanically. Since the wedge-and-roller mechanism illustrated is required to float from side to side, an articulating joint 114 is provided, so that the rod 112 need only slide. Thus the rod can be sealed conveniently by the hydraulic seal 115.

Figure 12:
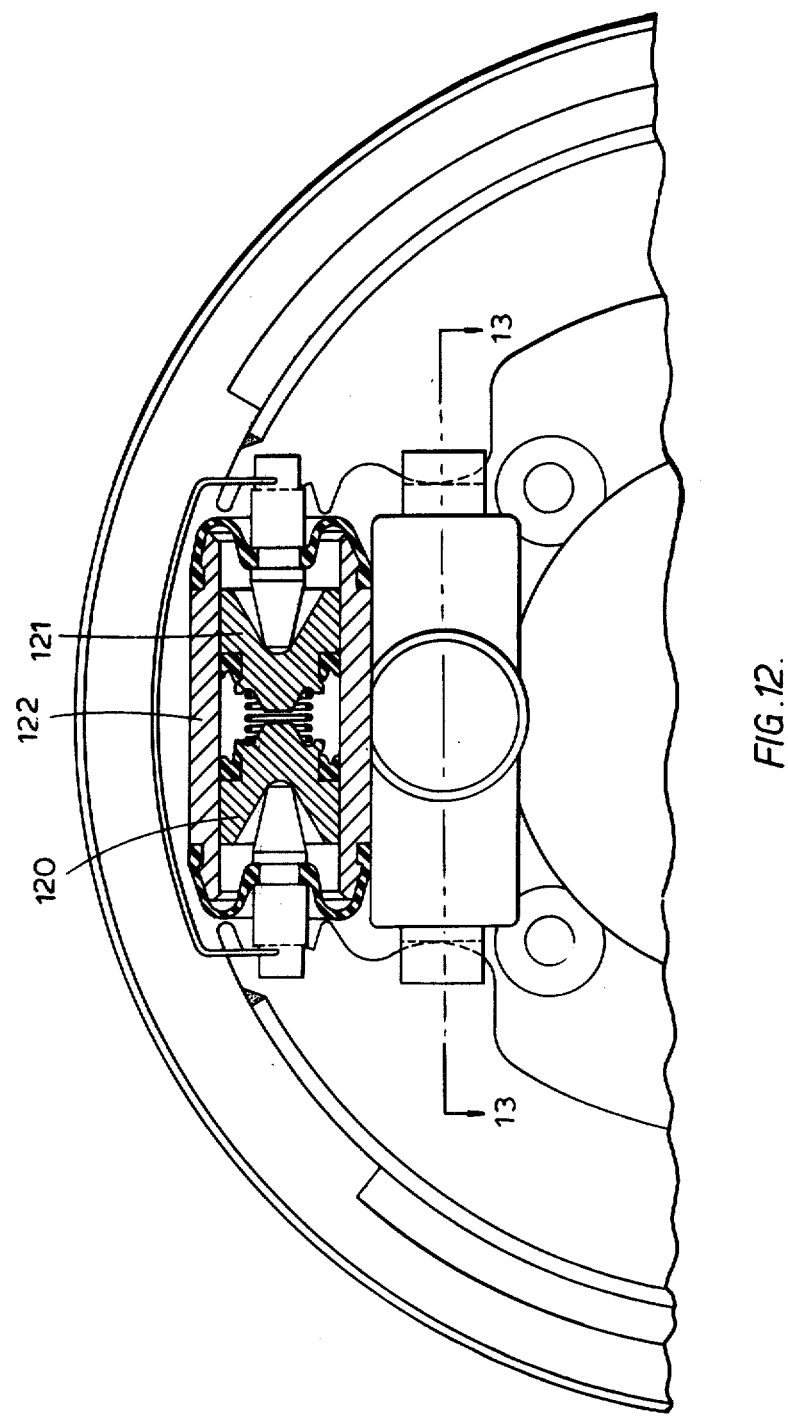
FIG. 12 is a sectioned elevation of part of a further brake.
Figure 13:
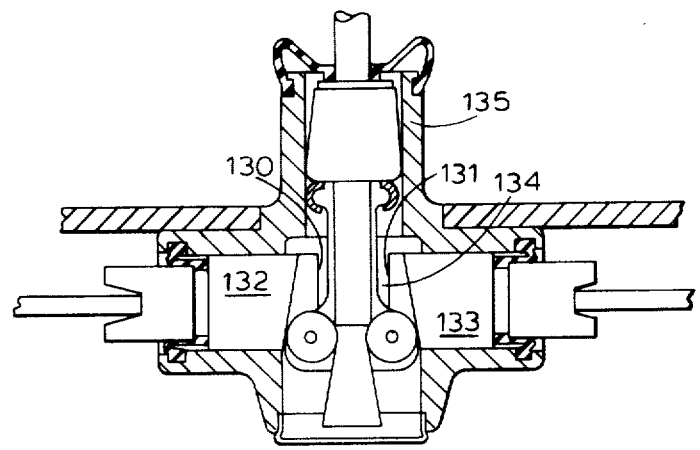
FIG. 13 is a section on line 13—13 of FIG. 12.

Alternatively, the combined mechanical and hydraulic actuator of FIGS. 9 and 10 may be replaced by separate actuators, as shown in FIGS. 12 and 13, FIG. 13 being a section on line 13—13 of FIG. 12. The hydraulic pistons 120, 121 do not abut the housing 122. The abutment here is provided by the ends 130, 131 of the tappets 132, 133 contacting the pillar 134 in the tappet housing 135.

Some means for adjusting the brake will normally be required, and a typical manual adjuster is shown in FIG. 6 (though not in FIGS. 7 and 8). The two pistons 62, 63 are themselves rotatable, whereas two tappets 67, 68 in screw-threaded engagement with the pistons, are not rotatable, being keyed to the shoes 1, 2. After removing a plug 70, a suitable tool can be inserted into serrations 69 on the flange 66 on the piston 63 to rotate the piston 63. A key engagement 71 is provided between the two piston 62, 63 so that the piston 62 rotates with the piston 63. Rotation of the piston 62, 63 causes the two tappets 67, 68 to be urged in opposite directions to compensate for wear of friction linings of the shoes 1, 2.

The adjusters could alternatively be incorporated into the hydraulic or mechanical actuators at the other side of the brake, or be disposed one at each side. As with any two-leading shoe arrangement it is necessary that both shoes are adjusted with respect to the fixed structure of the brake. It is not possible to compensate for wear on both shoes by only adjusting one relative to the fixed structure, as is possible in some other arrangements. If automatic adjustment is to be used, it is therefore necessary to have two quite separate wear sensing and compensating mechanisms, one for each shoe; or to gear the aduster screws together or to constrain them mechanically to move together, or to constrain them mechanically to move together in some other way, if only one wear sensor is to be used.

Figure 14:
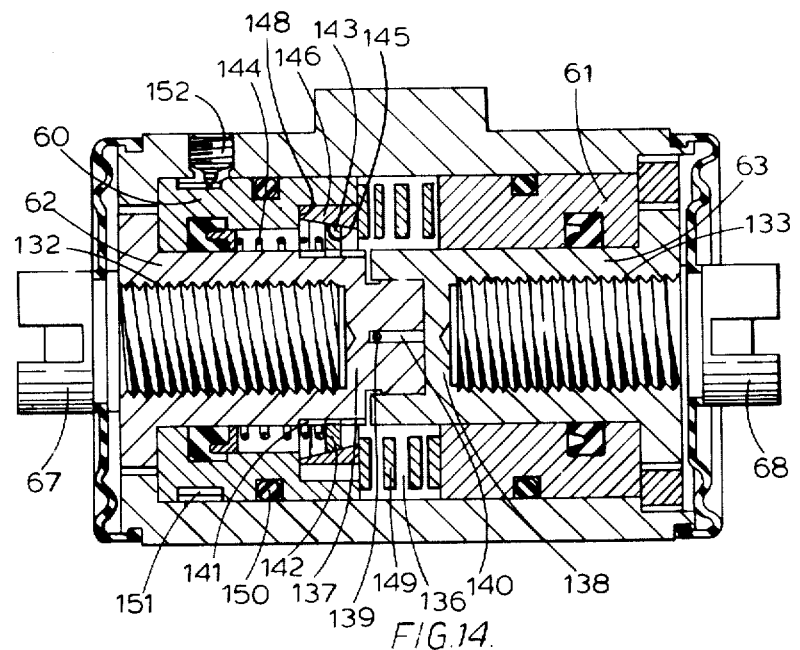
FIG. 14 is a section similar to FIG. 6 but including an automatic slack adjuster.

In FIG. 14 we have illustrated an adjuster similar to that of FIG. 6 but incorporating an automatic slack adjuster.

In the actuator of FIG. 14 the two tappets 67, 68 each have a slow-thread engagement 132, 133 with their respective pistons 62, 63. These engagements are remote from an hydraulic chamber 136 between the pistons 62, 63 by virtue of blind ends 137, 138. A pin 139 fits into a cross hole in the piston 63, and engages a slot 140 in the other piston 62 so that the pistons 62, 63 may move freely axially, relative to each other, but are constrained so that when they rotate, they do so in unison.

The piston 62 has a fast thread engagement 141 with a drive ring 142. (A fast thread is one in which an axial force between the two threaded components gives rise to a torque tending to cause relative rotation of the components, and is usually visually characterised by a steep helix angle. A slow-thread is one in which no such torque arises.) The drive ring 142 is formed with a conical outer surface 143 which is urged, by a spring 144, into engagement with a complementary surface 145 formed in a member 46. The member 146 is slidably mounted in the sleeve 60 and is urged against a stop 148 in that sleeve 60 by a spring 149.

When the brake is applied hydraulically, the piston 62 moves to the left, thus tending to drag the drive ring 142 away from its clutch engagement with the member 146, although the spring 144 holds the ring 142 against the member 146 whilst the piston 62 passes through the ring 142. The fast thread gives rise to a torque, so either the ring 142 or the piston 62 must turn. Because of the reduced contact force between the conical clutch surfaces 143, 145, the resistance of the drive ring 142 to rotation is low, so the ring 142 rotates.

When the brake is released and the piston 62 returns to the right, the ring 142 is increasingly forcefully clutched to the member 146, so that the ring 142 cannot rotate under such conditions. Thus the piston 62 is caused to rotate, as it returns axially through the ring 142. Turning the piston 62 is effective to turn the other piston 63 to screw the tappets 67, 68 away from each other, to take up excess slack.

If the piston 62 is required to rotate in this manner, but cannot actually do so because there is still some brake actuation force being transmitted through the threads 132, 133, then the piston 62 urges the drive ring 142 axially, and the drive ring 142, in turn, urges the member 146 in the same direction, to the right, against the load in the spring 149 and away from the stop 148. None of the components rotates during this movement. When the actuation force falls away, the spring 149 urges the member 146, and with it the drive ring 142, back against the stop 148. The piston 62 now once again moves through the ring 142. Since the ring 142 is clutched, the piston 62 rotates. If the member 146 were not movable in this way, then the threads 132, 133 would be damaged by trying to turn them whilst they are transmitting the high braking forces. Thus, a requirement for adjustment that occurs when the brake forces are high is not ignored, it is simply stored, and the compensating movement takes place later, when the forces have fallen.

On the other hand, the adjuster can actually be arranged to ignore signals for adjustment at the high forces, by making it "load-insensitive" as described above. However, in a manner similar to the adjuster shown, any such arrangement should cater for the "push-through" condition, as can occur if the vehicle to which the brake is fitted is arrested by the hydraulic actuation system whilst travelling uphill, but the mechanical actuator is then set, for parking the vehicle. The forces in the tappets and pistons are thus still high enough to hold the vehicle against rolling backwards, but the piston 62 moves to the right until it contacts the other piston 63. In the adjuster shown in the drawings, the spring 149 simply compresses, and the drive ring 142 is undamaged.

During operation of the adjuster, the reaction to the torque that is generated to turn the piston and the drive ring is felt by the sleeve 60. Normally however the friction of the hydraulic seal 150 carried by the sleeve 60 will be sufficient to hold the sleeve 60 against rotation. If it is not, non-circular formations such as teeth 151 are formed on the sleeve 60, and a plug 152 fixed to the housing engages the teeth 151. This arrangement has the benefit that the plug 152 is removable to enable the adjuster to be re-wound by engaging the teeth 151 with, for example, a screw driver as described above.

We claim:

1. An internal shoe-drum brake for a vehicle comprising first and second arcuate shoes carrying friction linings for engagement with a rotatable drum, each of said shoes having a first end and a second end, an hydraulic actuation system for applying said shoes to said drum for normal service braking, and a mechanical actuation system operable independently of said hydraulic actuation system for applying said shoes to said drum for parking or emergency braking, said first ends of said shoes constituting leading ends for one direction of drum rotation and trailing ends for the other direction of drum rotation, and said second ends of said shoes constituting trailing ends for said one direction of drum rotation and leading ends for said other direction of drum rotation, wherein said hydraulic actuation system comprises a first hydraulic actuator which acts on said leading end of said first shoe and a second hydraulic actuator which acts on said leading end of said second shoe whereby, for said normal service braking, said brake acts as a brake of the two-leading shoe type, and said mechanical actuation system acts on the leading end of only one of said shoes, and means are incorporated for transmitting thrust from the trailing end of the said one shoe to the leading end of the other of said shoes whereby, for said parking or emergency braking, said brake acts as a brake of the duo-servo type, said first hydraulic actuator comprising a first piston disposed at said leading end of said first shoe, said second hydraulic actuator comprises a second piston disposed at said leading end of said second shoe, means for supplying hydraulic fluid under pressure to said first and second pistons to apply said shoes to said drum, and first and second abutments against which said trailing ends of said shoes are adapted to rest, one of said abutments being fixed with respect to the respective one of said shoes, and the other of said abutments including an auxiliary hydraulic piston, a fixed stop with which said auxiliary piston is engageable, and means for subjecting said auxiliary piston to said hydraulic fluid under pressure to urge said auxiliary piston against said fixed stop at least when said hydraulic fluid under pressure is supplied to said first and second pistons in opposition to the reaction from the trailing end of one of said shoes which is in engagement with said auxiliary piston, the area of said auxiliary piston being chosen such that said auxiliary piston is held against said stop to counter said reaction from said trailing end of said one of said shoes, said means for transmitting thrust comprising a floating mechanical strut operating between said shoes to transmit said reaction from said trailing end of the said one of said shoes to said leading end of the other of said shoes when no hydraulic pressure is applied to said auxiliary piston.

2. A brake as claimed in claim 1, wherein said brake is of the two-leading shoe type for hydraulically actuated service braking and of the duo-servo type for mechanically actuated parking, or emergency braking, for both directions of drum rotation.

3. An internal shoe-drum brake for a vehicle comprising first and second arcuate shoes carrying friction linings for engagement with a rotatable drum, each of said shoes having a first end and a second end, an hydraulic actuation system for applying said shoes to said drum for normal service braking, and a mechanical actuation system operable independently of said hydraulic actuation system for applying said shoes to said drum for parking or emergency braking, said first ends of said shoes constituting leading ends for one direction of drum rotation and trailing ends for the other direction of drum rotation, and said second ends of said shoes constituting trailing ends for said one direction of drum rotation and leading ends for said other direction of drum rotation, wherein said hydraulic actuation system comprises a first hydraulic actuator which acts on said leading end of said first shoe and a second hydraulic actuator which acts on said leading end of said second shoe whereby, for said normal service braking, said brake acts as a brake of the two-leading shoe type, and said mechanical actuation system acts on the leading end of only one of said shoes, and means are incorporated for transmitting thrust from the trailing end of the said one shoe to the leading end of the other of said shoes whereby, for said parking or emergency braking, said brake acts as a brake of the duo-servo type, said first hydraulic actuator comprises a first pair of pistons disposed between said first end of said first shoe and said second end of said second shoe, said second hydraulic actuator comprises a second pair of pistons disposed between said second end of said first shoe and said first end of said second shoe, two fixed stops and two auxiliary pistons in the form of annular sleeves, each of said auxiliary pistons being engageable with a respective one of said stops and concentrically surrounding a respective one of said second pair of pistons, means are provided for supplying hydraulic fluid under pressure to said first and second pairs of pistons to apply said shoes to said drum and for subjecting said auxiliary pistons to said hydraulic fluid under pressure to urge said auxiliary pistons against said fixed stops at least when said hydraulic fluid under pressure is supplied to said first and second pairs of pistons, the area of said auxiliary pistons being chosen such that each one of said auxiliary pistons is held against its respective stop to counter reaction from an associated shoe end, said second pair of pistons being in abutment in the absence of hydraulic pressure to constitute a floating mechanical strut which acts between said shoes to transmit the reaction from the trailing end of one of said shoes to the leading end of the other of said shoes when no hydraulic pressure is applied to the auxiliary pistons for both directions of drum rotation, and said mechanical actuation system comprises a floating expander which acts to urge said first end of said first shoe apart from said second end of said second shoe, wherein said brake is of the two-leading shoe type for hydraulically actuated service braking and of the duo-servo type for mechanically actuated parking, or emergency braking, for both directions of drum rotation.

4. A brake as claimed in claim 3, wherein said second pair of pistons are coupled together against relative rotation and tappets are provided through which said pistons act on said shoe ends, said tappets being in screwed-threaded engagement with said pistons and being held against rotation by said shoe-ends, rotation of said pistons relative to said tappets causing said tappets to move relatively away from each other to compensate for wear of said friction linings.

5. A brake as claimed in claim 4, wherein an adjuster member is incorporated for rotating said second pair of pistons manually.

6. A brake as claimed in claim 4, incorporating adjuster means for rotating said second pair of pistons automatically.

7. A brake as claimed in claim 6, wherein a drive ring has a fast thread engagement with one of said second pair of pistons, and a member is mounted in one of said auxiliary pistons, said drive ring being urged at all times into engagement with a conical surface in said member, and said member being non-rotatable with respect to said auxiliary piston, but being slidable with respect thereto, said auxiliary piston being provided with a stop into engagement with which said member is adapted to be urged, and a spring is provided for urging said member against said stop such that said member moves clear of said stop, against the load in said spring, in the event that the load required to cause said piston to rotate with respect to said tappet with which the said piston is screw-threadably engaged rises above a predetermined value.

* * * * *